RICHARD F. DYER
INVENTOR.

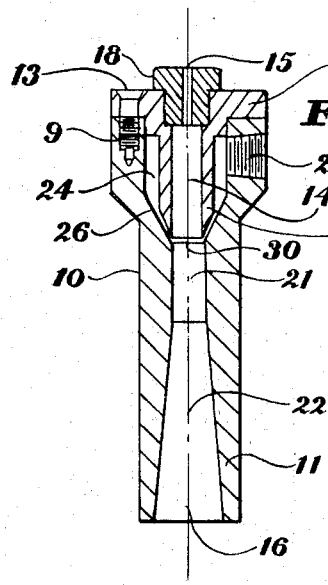
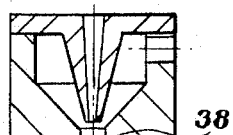
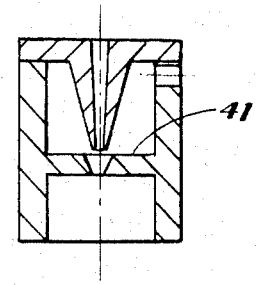
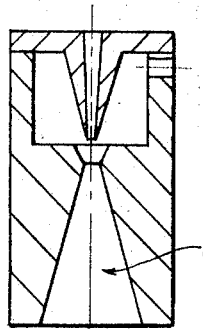
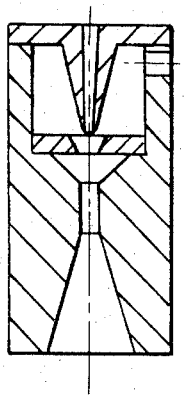
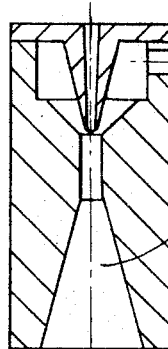
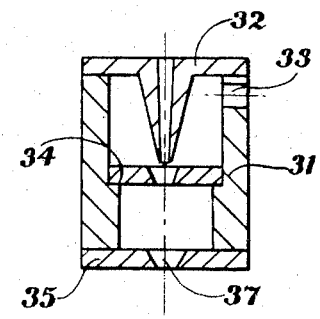

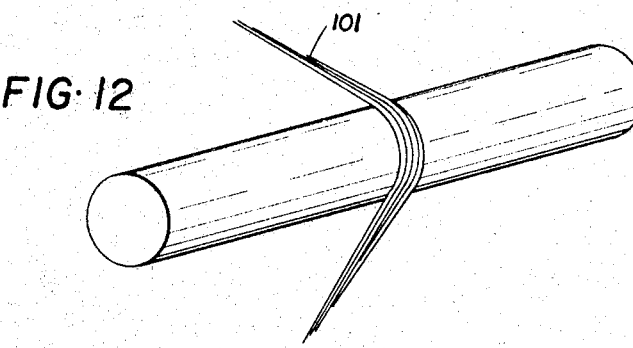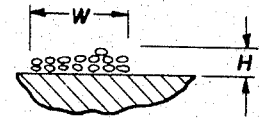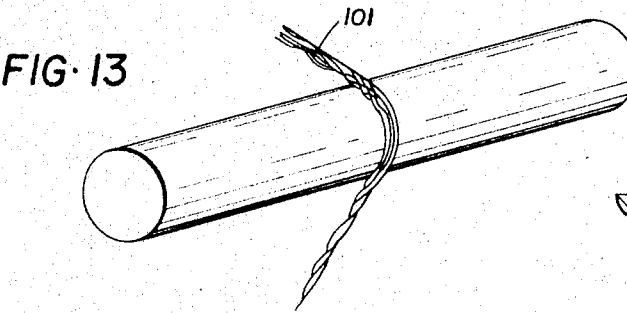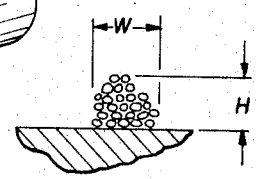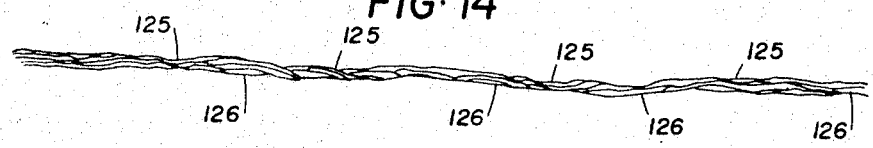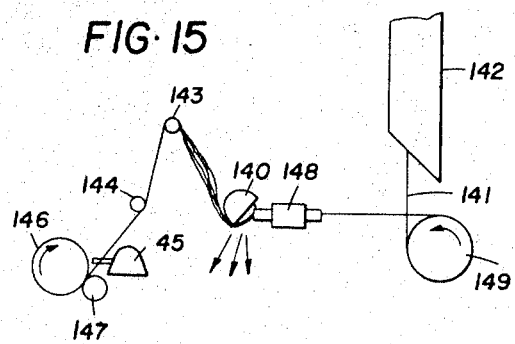

United States Patent Office 3,453,709
Patented July 8, 1969

3,453,709
APPARATUS FOR TREATING FILAMENTARY MATERIAL
Richard F. Dyer, Kingsport, Tenn., assignor to Eastman Kodak Company, Rochester, N.Y., a corporation of New Jersey
Continuation of application Ser. No. 559,701, Apr. 27, 1966. This application July 22, 1968, Ser. No. 750,710
Int. Cl. D02g *3/00;* D01h *13/26*
U.S. Cl. 28—1                                 11 Claims

ABSTRACT OF THE DISCLOSURE

Method and apparatus for treating a bundle of continuous multifilament spurn yarn wherein the yarn passes through a jet to which is supplied a pressurized gaseous fluid, including devices for controlling the speed of the yarn and the amount of tension applied thereto. Tension, pressure and speed control determine whether the treatment will impart loop and whorls to the bundle or whether the filaments will be entangled but free of loops and whorls.

---

This application is a continuation of application Ser. No. 559,701, filed Apr. 27, 1966, now abandoned. Application Ser. No. 559,701 is a continuation and a division, respectively, of my two companion applications, Ser. Nos. 446,514 (filed Apr. 8, 1965) and 466,141 (filed June 7, 1965), both now abandoned. This application includes only the subject matter included in the three said applications. Application Ser. No. 446,514 is a division of my companion applications Ser. Nos. 75,396 (filed Dec. 12, 1960) and 237,142 (filed Nov. 13, 1962), now abandoned and a continuation-in-part of my application Ser. No. 302,380 (filed Aug. 15, 1963), now abandoned; and applications Ser. Nos. 75,396 and 237,142 are continuations-in-part of my application Ser. No. 400,544 (filed Dec. 28, 1953), now abandoned. Application Ser. No. 466,141 is a continuation of my application Ser. No. 400,544 (filed Dec. 28, 1953).

This invention relates to the treatment of filamentary materials with jet devices adapted for use in blowing air onto the yarn.

The invention also relates to a method and apparatus for employing a jet device of the present invention for producing a twistless, or substantially twistless, continuous multifilament yarn which can be used without addition of twist in woven and knitted fabrics and other textile end products.

In the textile industry there are many instances where jet devices of the class described are utilizable in the handling and the treating of filamentary material such as filaments, fibers, yarn, thread, tows and the like. For example, in some instances such devices are useful in motivating the material. In other instances the devices may be used to apply a certain type of treatment to the attenuated material. Or, in a number of situations, combination of motivation and treatment may be desired. The various purposes for which jet devices in accordance with the present invention may be utilized will be further apparent from the description which follows.

For example, in U.S. Patent 1,683,478 the general use of an air jet to motivate filamentary material is described. In U.S. Patent 2,100,588 the use of an air jet to impart a curl to yarn filaments is shown and in U.S. Patent 2,067,251 an air jet is provided to fluff up and loosen up a bundle of filaments by placing them in a state of substantial but incomplete parallelism. The latter patent actually fluffs up or bulks the yarn enough so as to require a yarn takeup speed after the jet which is less than the delivery speed to the jet, and the contraction in yarn length results in an increase in denier. This patent shows the use of the jet to motivate the yarn material.

One difficulty with these existing jet devices and other of the prior art, however, was their inefficiency particularly as regards the large volume of air at high pressures which was required to make such jets operative. In general, such jets were intended for processing heavy tows of yarn of say 20,000 denier with no particular attempt to use very high velocity air.

It is, therefore, apparent that the development of small, highly efficient jet devices particularly adapted for the motivating and treating of small denier yarns in the range of 55 to 5000 denier represents a highly desirable contribution to this art. For example, it has been found that by applying extremely high velocity air to yarn the cost of moving the yarn can be appreciably reduced, and also that under certain conditions novel and unusual yarn effects can be produced. In accordance with one feature of the present invention, I have found by maintaining the yarn passing through the jet under a certain degree of tension, that the separation of filaments and resultant fluffing up of the yarn can be avoided.

In accordance with another feature of the invention by maintaining the yarn passing through the jet under considerably less tension, coils, ring-like loops and whorls are formed along the yarn surface.

After extended investigation I have discovered certain novel jet devices which have utility for use in treating attenuated material, such as yarn, in various manners.

This invention has for one object to provide an improved jet device for use in motivating and/or treating filamentary material. Still another object is to provide a jet device as aforementioned which is particularly useful for applying a stream of air or similar fluid to yarn or the like material. Still another object is to provide a device which is of relatively simple construction and which is susceptible of use in various types of processes of treating filaments, fibers, yarn and the like material.

In the preparation of the warp yarn for a woven fabric, it is customary to apply a liquid size to the sheet of warp ends and then dry the sheet of warp ends by passing them over heated dryer drums. The ends are then separated by passing alternate ends over and under a split rod to break the cured size film which tends to bind one end to the adjacent ones. The size film on the yarn acts as a protection against the severe abrasive action of the drop wires, heddles, and the reed of the loom in the subsequent weaving operation. If broken filaments are present in the yarn, the size film prevents them from being stripped back to form a fuzz ball defect in the fabric as it is woven. It is customary to use only twisted yarn in the warp of a fabric since twisting the individual filaments of a yarn together reduces the effective diameter of the yarn and also reduces the tendency of individual filaments to strip back. Also in passing the ends over and under the split rod in slashing if no twist is used in the yarn, individual filaments in an end of yarn may be bonded by the size film more firmly to an adjacent end than they are to their own yarn end. Twist in a bundle of filaments or a yarn end thus helps each end of yarn to retain its identity and prevents occasional filaments from getting mixed up with adjacent ends of yarn.

Twisting a yarn usually requires a separate operation on a special machine after the yarn has been extruded but prior to winding on a beam or cone. Twist, thus, represents an additional cost in the manufacture of a continuous multifilament yarn.

A number of means have been proposed for eliminating the need for twist in warp yarns. A number of U.S. patents, propose methods and apparatus for separating the yarn ends in slashing prior to curing or drying of the size film. Thus, there is less chance of filaments being more strongly bonded by the size to an adjacent end of yarn than they are to their own end. Another procedure is to reduce the number of ends per inch or width of the warp so that no end touches another end as it goes through the size bath and is cured on the dryer drums. Use of this procedure, however, usually requires the use of two beams of yarn per loom to achieve the desired number of warp ends per inch of fabric. These methods involve expensive equipment and have not been widely accepted by the trade.

Other methods have also been proposed for eliminating the need for twist and include the application of a binder material to the individual bundles of filaments or yarn ends as they are spun. High spinning speeds make it difficult to evenly apply and cure such a binder, however.

Measurements of the diameter or width of an end of 75 denier 19 filament yarn end held tightly over the curved surface of a roll reveal the effect of twist in reducing the width of the yarn as shown in Table I. This table also shows the maximum ends per inch of yarn that could be laid parallel on a roll without touching each other.

TABLE I

| Twist: | Diameter Inches | Ends/Inch |
|---|---|---|
| 0.0 | .0161 | 62 |
| 0.2 | .0112 | 89 |
| 0.6 | .0080 | 125 |
| 1.0 | .0061 | 164 |
| 2.0 | .0057 | 175 |
| 5.0 | .0057 | 175 |

It is apparent from this table that low twist or zero twist yarn as used in practical fabrics of 140–200 warp ends/inch will have considerable overlapping of adjacent ends on conventional slasher rolls and guide bars, and these low and zero twist yarns will also be most prone to filament separation due to lack of twist to bind the filaments in an end of yarn together.

In addition to the problems of filament separation of prior art zero twist yarns used as the warp of a woven fabric, prior art zero twist yarns also are more easily damaged in othe textile processes such as circular and tricot warp knitting and in winding and quilling of yarn to be used as the filling yarn in a woven fabric. In all of these processes, prior art slightly twisted yarn performs better with fewer yarn and fabric defects being incurred if the yarn is twisted slightly, for example, to say only one turn per inch. However, as mentioned above, the addition of twist in a separate operation adds to the cost of the yarn.

Another problem with prior art zero twist yarn is its inherently high coefficient of friction as compared to twisted yarns. This high friction results in high and more variable processing tensions and resultant yarn damage in the form of broken filaments, uneven packages, ridged section beams, and over-stretched yarn. Table II shows the effect of twist on 150 denier 38 filament acetate yarn friction on typical textile guide materials at a yarn speed of 300 yards per minute at a constant output tension of .1 g./d.

TABLE II

| Yarn twist: | Friction on polished steel | Matte ceramic |
|---|---|---|
| 0.0 | .54 | .33 |
| 0.3 | .52 | .30 |
| 1.0 | .45 | .29 |
| 2.0 | .40 | .28 |
| 5.0 | .32 | .27 |
| 10.0 | .28 | .26 |

It is, therefore, apparent that it would be highly desirable if an apparatus could be developed to bind the filaments together in the spinning or beaming operation by some means other than prior art type twisting of the yarn. After extended investigation I have discovered an apparatus arrangement which overcomes or minimizes many of the aforesaid difficulties of the prior art.

Thus, in addition to the objects stated above pertaining to the jet device per se, it is an object of this invention to disclose apparatus and means for interlocking the individual filaments in a continuous multifilament zero twist yarn to reduce the effective diameter of the yarn and to reduce the tendency of individual filaments to become separated from the parent multifilament yarn strand. A further object is to disclose apparatus and means for interlocking individual filaments in a multifilament yarn as an inherent part of the spinning and winding up of freshly extruded yarn. A still further object is to disclose a process and apparatus for interlocking the filaments of a multifilament yarn as an inherent part of the winding or beaming operations in preparing the yarn for subsequent processing the yarn into a textile end product. Still a further object of this invention is to disclose a process and apparatus for treating a zero twist yarn so as to significantly reduce its coefficient of friction on textile guides. Another object is to provide a zero twist continuous multifilament yarn product which is characterized by a low coefficient of friction. A still further object is to provide a zero twist continuous multifilament yarn product characterized by its narrow average width when passed around a guide or roll under tension. Other objects will appear hereinafter.

For an understanding of my invention, reference will be made to the attached drawings forming a part of the present application.

FIG. 1 is a section, side elevation view of one of the preferred jet devices in accordance with the present invention.

FIGS. 2, 3, 4, 5, 6 and 7 are likewise sectional, side elevation views of other species of jet devices.

FIG. 12 is a schematic perspective view of a conventional zero twist yarn wrapped around a curved surface.

FIG. 12a is a transverse cross-sectional view of a zero twist yarn passing over a guide surface.

FIG. 13 is a schematic perspective view of an interlocked continuous multifilament yarn of the present invention wrapped around a curved surface.

FIG. 13a is a transverse cross-sectional view of the interlocked continuous filament yarn of the present invention passing over a guide surface.

FIG. 14 is a diagrammatic view of the intermittent type of interlocked continuous multifilament yarn in accordance with the present invention.

FIG. 15 is a side elevation view which shows an alternate apparatus arrangement in accordance with the present invention using a segmented air deflector rod in place of an exhaust hood.

Figure 8:
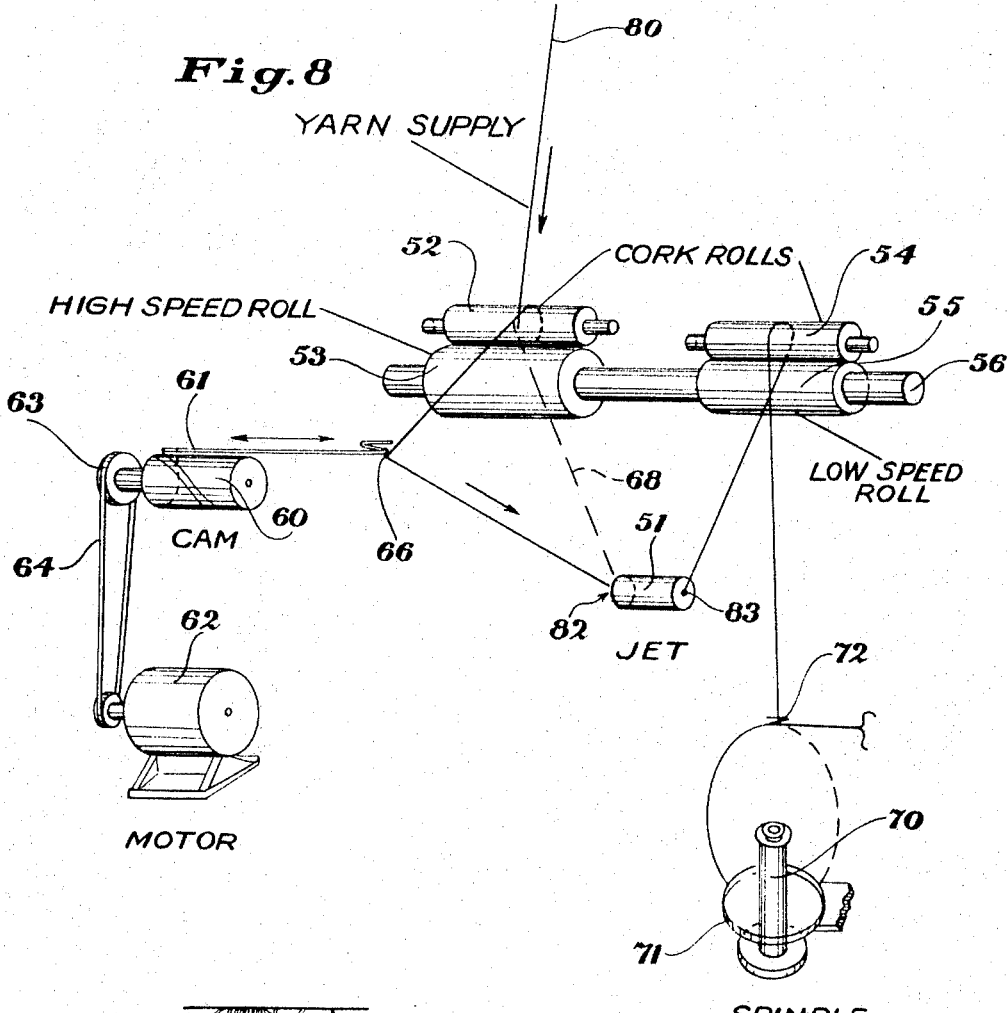
FIG. 8 is a semidiagrammatic, side elevation view of a combination of equipment illustrating an apparatus arrangement employing my jet devices.

Referring to FIG. 1, there is shown in section a jet device 10 in accordance with the present invention. This device is made up of the two members 11 and 12 which may be assembled together, for example, by means of a set screw inserted at 13 which engages threads 9. A passageway 14 extends through the jet device so that the filamentary material such as yarn may be passed from a position at 15 to exit at position 16.

This passageway or channel 14 in member 12 is of substantially uniform diameter except that for the upper portion thereof provision is made at the outer end thereof for the insertion of a member 18 called a thread guide. This thread guide is preferably made of ceramic material in order to provide a very smooth, substantially frictionless, surface over which the yarn passes. However, certain smooth, highly polished metal guides may be used. As shown in the drawing, the opening through the thread guide may be of somewhat smaller diameter than the diameter of the passageway 14.

The lower portion of member 12 is suitably tapered as at 27, say to an angle between 30–60°, and for providing in conjunction with the tapered surface 26 of member 11 an annular orifice or passageway for metering the air flow into the central passageway 21.

Referring now to member 11, there is provided in or near the center thereof, a passageway of substantially uniform diameter 21, which passageway, however, flares outwardly a few degrees, as for example between 6–10° in the portion 22.

The special construction of this portion of my jet is of some importance in order to assure a maximum velocity of air with a minimum air pressure in the passageway of uniform diameter and a smooth transition in the flared portion which exits to the atmosphere. For example, it has been found that highest efficiencies result when the length of the uniform passage 21 is about three times its diameter and the diameter of the flared portion 22 at the exit 16 end is about 2½ times the diameter of the uniform passageway 21, and the taper of the flare is between 6° and 10° included angle. In addition the diameter of the intake tube 12 should be about 40% of the diameter of the uniform passageway in member 11. These conditions result in a maximum intermingling of air and yarn in member 11 and also when the members 11 and 12 are properly positioned causes a suction in tube 12 which makes the jet self-threading and particularly suitable for removing and conveying yarn away from a godet or feed roll where no subsequent wind up operation is involved. It was also noted in using this jet design in the manner just described, i.e., to remove yarn from a roll, that the very high velocity of the air caused an appreciable separation and subsequent tangling or loopiness in the yarn when a large number of fibers made up the yarn strand. The increase in loopiness was much greater than had been obtained by previously known jet designs. I have also found that if a small amount of tension is maintained in the yarn strand subsequent to its exit from the air jet that the loopiness can be eliminated. Also as will be pointed out hereinafter, I may angle the treated yarn away from the exhaust jet to impart improved tangling to loopiness.

The upper portion of member 11 is provided with suitable inlet opening 23 to which a conduit, pipe, hose or the like may be attached for introducing the treating material such as air. This opening leads into the chamber portion 24 which is of sufficient diameter to contain member 12 and to provide a relatively uniform space thereabout. However, the walls defining this space 24 are flared inwardly at 26 to provide an angular slope somewhat less than the angular slope 27 on part 12.

It will be observed from the preceding description of my jet device that the internal construction thereof is such as to obtain a venturi effect on the air flow. I have found that it is particularly important in the jet construction to be used in processing yarn and the like, that there be reasonably exact concentricity. That is, there should be accurate concentricity of the tip of the nozzle as at 30 and the opening of the orifice plate or venturi throat as at 21. In other words, considering the device of FIG. 1, passageway or channel 14 should be exactly aligned with passageway 21, which means that the spacing between surfaces 26 and 27 would be uniform around the entire circumference thereof.

By the construction just described I have found that a stream of air may be effectively applied to filamentary material passing therethrough. The air may be applied in varying amounts and under various pressures, not only so the filamentary material is motivated through the device, but various items may be controlled. That is, the amount of tension applied to the yarn by virtue of the air flow can be controlled to a low amount. The effect of the air on the yarn may be controlled to secure various effects as will be more apparent from tables and other data hereinafter set forth.

Reference is now made to FIGS. 2 to 7, inclusive, showing various other species of jet devices. It will be noted that FIGS. 2, 4 and 6 concern construction somewhat similar to the construction already described above in connection with FIG. 1.

FIGS. 2 and 4 show jets which are somewhat less efficient in operation as compared with the jet shown in FIG. 1 since these modified jets require higher air pressure and generally cause less loopiness in the yarn. In the jet of FIG. 2 this is due primarily to the fact that the walls of passageway 38 do not diverge outwardly as compared to the flared passage 22 shown in FIG. 1. In the jet of FIG. 4 this is due primarily to the fact that there is no central passageway 22 with parallel walls as there is in FIG. 1, and the flared passage 39 diverges at too great an angle.

FIG. 6 shows a version of the jet with smaller passageways for smaller yarn sizes, omits the wear resistant insert of FIG. 1, and shows a more extreme flaring angle at 40.

Referring to FIGS. 3, 5 and 7, it will be observed that the structures therein disclosed are somewhat different.

In FIGS. 3 and 7 are shown jets in which orifice plates 41, 31 and 37 are substituted for the venturi tube and as will be recognized by those familiar with the art are the fluid flow equivalents of venturis but are less efficient in operation than the venturis of FIG. 1 or 6. The amount of suction obtained is small and in some cases these two forms may not be self-threading. Insofar as imparting a loopy treatment to the yarn is concerned, they are about equal in performance to the jet of FIG. 1 but require somewhat more air pressure to achieve the same degree of loopiness. Their chief advantage is simplicity of manufacture.

In FIG. 5 is shown a form of jet which combines an orifice and a venturi which results in greatly increased efficiency and will impart improved loopiness to the yarn at lower air pressures than any of the other forms shown. The design proportions for this jet fall in the same range as those for the jet of FIG. 1. It will be recognized that by using wear resistant ceramic materials for the orifice plate, entrance tube and venturi excellent resistance to yarn abrasion can be obtained. FIG. 7, for example, is made up of two parts 31 and 32 corresponding approximately to parts 11 and 12 of FIG. 1. A suitable opening is provided at 33 for attaching conduit pipe or the like for the introduction of the air or like fluid. However, in this species of construction of FIG. 7 there is provided one or more plate members 34 and 35. These orifices may be provided, and preferably are equipped, with suitable thread guide inserts. Such type elements have already been described in connection with part 18 of FIG. 1.

In these species of devices of FIGS. 2 to 7, here again it will be observed that there is concentricity of the tip or end of the nozzle and the opening or openings of the orifice plates. As indicated above, it is desirable that various parts are aligned so that the yarn or the like material being treated may travel in a reasonably straight, unobstructed path through the jet.

The various species of jets shown in FIGS. 2 to 7 may be used in some instances for imparting special treatment to filamentary material. Or, in some instances where material of a different size (denier) than normal or common filamentary material is being processed, these special jets may be of value.

Referring now to FIG. 8, I have there shown one type of arrangement wherein the jet devices of the present invention may be used in combination with other apparatus parts. The diagrammatically-indicated jet device 51 may be comprised of any of the devices of FIGS. 1 to 7, already described in detail above, and is provided with a suitable fluid supply under the proper pressure. The jet device 51, suitably held by a bracket or the like, not shown, is positioned from 1″ to 24″, for example, away from, but in the same general vicinity as the positioning of a plurality of sets of rolls 52, 53, 54, and 55. The rolls just referred to may be conventional rolls well-known in the textile industry. The rolls 53 and 55 may be driven on a common shaft 56. In connection with roll 55, it will be noted that this roll is of a smaller diameter than roll 53 for the purpose of securing a lower speed.

Also positioned in close proximity with the rolls and jet is a cam device 60. This assembly may be driven by a motor or other suitable source of power 62, the power being applied to the cam through pulley 63 driven by belt 64.

Also in reasonably close proximity to the parts just described is a conventional spindle 70. The spindle is provided with the usual accessories such as a traveler ring 71 and one or more thread guides 72, so that the treated yarn may be wound up in the usual manner and given a certain amount of twist, if desired.

Figure 9:
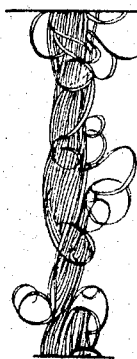
FIG. 9 is a diagrammatic illustration of yarn product which has been treated in devices and by processes of the present invention, as such yarn product would appear when viewed through a low-powered magnifying or reading glass.

Referring now to FIG. 9, only brief reference will be made to FIG. 9 at the present time. FIG. 9 shows one form of yarn which may be obtained by using the jets and other equipment of the present invention. It will be observed from FIG. 9 that this yarn has a large number of loops and whorls spaced along the yarn surface. Further reference will be made to FIG. 9 hereinafter.

I have found that filamentary material, particularly cellulose ester yarn produced by dry spinning, can be processed in various manners by the apparatus described in detail above. A more complete understanding of my process, as well as the functioning of the above-described jets and other apparatus parts, can be had by describing the processing of yarn in an apparatus combination such as illustrated in FIG. 8.

Referring to FIG. 8, suitable source of yarn 80 is fed around the first roll 52. This yarn, in accordance with my preferred embodiment, would be a conventional cellulose ester yarn such as a dry spun cellulose acetate yarn. For example, 300 denier, 75 filament yarn with only a small amount of twist, could be used.

This yarn passes one turn around roll 52 and then through the eyelet 66 of the movable thread guide 61. The yarn then enters the inlet of jet 51 at point 82 and leaves the jet at point 83. It will be noted that the yarn at the point of leaving the jet is drawn angularly away from the jet for the purpose of removing the yarn from the exhaust air coming out of jet 51.

In jet 51 the yarn passing therethrough is given a treatment with air supplied to the jet. The various details respecting the amount of air supplied to the jet and the like will be set forth hereinafter. These items, to some extent, depend upon the degree and type of treatment desired, the character of the yarn being treated and similar factors.

The treated yarn from the jet then passes around low-speed roll 54. From low-speed take-up roll 54 the yarn is then passed to spindle 70 where it is wound up in the convention manner.

The above material which has been generally described with respect to the apparatus arrangement of FIG. 8 will now be considered in more detail. For example, the yarn 80 which is to be processed, comprises cellulose ester yarn containing at least 50 filaments, and in many instances, a larger number of filaments. This yarn is preferably in a substantially untwisted condition but may have say up to 4 turns per inch therein.

I have observed that such type of filamentary material such as the yarn just mentioned, when passed through an air jet device in accordance with the present invention, and air under some pressure is applied to the yarn, that certain distinct effects are accomplished on the surface of the yarn.

The yarn passing through the jet 51 should be collected or removed under relatively low tension. The air at high velocity in the venturi or throat section of the jet coming in contact with the filaments causes the production on the surface of the yarn of numerous randomly spaced ring-like loops and whorls. These loops may vary in size from about $\frac{1}{64}''$ to $\frac{1}{4}''$ depending upon the air pressure to the jet, speed of passage of the filament, the denier and the like factors. In general, the greater the number of filaments under little or no twist, the greater the number of the loops which are produced on the surface of the yarn.

The aforementioned production of loops and whorls gives an effect to the yarn as diagrammatically indicated in FIG. 9. Likewise, the production of the loops in the yarn causes some contraction of the yarn, say 10 to 30%. Hence, one reason for the lower speed take-up rolls 54 and 55. The design and speed of operation of these so-called low speed rolls are such that, keeping in mind the aforementioned contraction, the rolls will be operated in a manner so that there would still be very low tension on the treated yarn as it emerges angularly from jet 51. Upon windup on the spindle 70 the speed of operation of the spindle may be chosen to impart whatever number of turns is desired in the yarn to, so-to-speak, set the permanency of the aforementioned loops and whorls which have been placed on the yarn. Between 1.5 and 5 turns per inch are usually satisfactory.

From the preceding considerations it will be observed that the yarn can be permitted to pass from around roll 52 substantially directly to inlet 82 of the jet, say along the path designated 68, so there is relatively low tension on the yarn. Accordingly, jet 51 functions to impart to the yarn, under low tension, the numerous randomly spaced loops mentioned above to give a yarn having an appearance as shown in FIG. 9.

It might be pointed out here that if the yarn emerging from the jet 83 is collected directly in a container without passing around the rolls 54 and 55 it will inherently possess the loopy characteristics shown in FIG. 9. However, in this form the yarn would not be readily usable in subsequent operations. Of course, the use of a bobbin to wind up the yarn assures easy subsequent processing of the yarn.

However, if the yarn is put under tension by pulling it out of normal path 68 (by means of moving thread guide 66), such tension prevents the action of the air in jet 51 from affecting the surface of the yarn to impart loops and whorls therein. Therefore, by means of the apparatus and process concerning FIG. 8, I have found it is possible to process yarn in a special manner to produce a novel and distinct product which I designate intermittently bulked yarn.

In further detail, the reciprocating thread guide and associated parts 61 and 66, when it pulls the yarn entirely away from its normal path, as shown in the drawing, permits no bulking (loop formation and contraction) to take place. As guide 66 by means of cam 60 is permitted to return to position so that the feed yarn 80 is under substantially less or no tension from the effect of the reciprocating member 66, then the yarn passing through jet 51 becomes processed to that, say up to 30% theoretical bulking takes place.

Hence it can be seen that if the speed of pull-out and return of 61 and 66 are equal, the bulked and unbulked lengths of the novel yarn of the present invention are about equal. By using a slower pull-out than return, the unbulked yarn length increases relative to the bulked section. A fast pull-out and a slow return causes the bulked length to increase relative to the normal sections. A speed differential between pull-out and return strokes will, however, tend to reduce the denier differential between the bulked and unbulked yarn and may, in some cases, produce a bulked and semibulked yarn. It can also be seen that by varying the length of the pull-out the combined length of a bulked and unbulked section can be varied; that is, the frequency can be affected. Also, by putting twist into the processed yarn, the bulkiness and appearance may be altered somewhat.

It will be recognized that the effect of the reciprocating guide 66 is to vary the input speed of the yarn to the jet in a manner such that during the pulling out of the yarn loop the input yarn speed and takeup yarn speed from the jet are substantially equal while during the release of the locks of yarn caused by the return of the guide 66 the effect is to make the delivery speed of the yarn to the jet substantially greater (say about 30%) than the speed of takeup of the yarn from the jet. Obviously, a like result could be obtained by driving the high speed rolls 52 and 53 from a separate and variable speed source not shown while the slow speed rolls 54 and 55 are driven at a constant speed. However, on existing textile machinery there is often not space for an extra drive shaft and the provision of a separate variable speed drive is inconvenient, whereas there is often provision made, particularly on wet twisting machinery common continuous filament yarn processing, for a reciprocating guide bar with a guide at each spindle position.

It is believed apparent from the foregoing description that it can be seen when using my novel jet device in combination with certain other textile apparatus parts, it is possible to give filamentary materials, such as yarn, a variety of treatments to prepare products having various novel and distinct appearances. These products, because of the contraction in length and increase in size (diameter) by virtue of the numerous loops and whorls, also have a different hand than the untreated material.

While the foregoing example described in connection with FIG. 8 represents one of the preferred embodiments of my invention, it is understood that my novel jet devices may be used in different manners and for a variety of purposes. For example, the jet construction disclosed in detail in FIG. 1 of the present application may be positioned in some suitable manner closely adjacent a godet or feed roll as on a spinning or twisting machine. In such construction the jet of FIG. 1 would be provided with approximately a $\frac{1}{16}$" orifice in member 18. The air supply to opening 23 could be of the order of 5–50 p.s.i. Under such conditions the yarn coming off the godet roll would be motivated through the jet device at a tension of about .05 gram/denier for the purpose of keeping waste yarn from accumulating on the rolls during a doffing of bobbins or a yarn break at the windup means.

The yarn emerging from the jet positioned adjacent the godet roll, as just described, I observed to have substantial number of whorls and loops on its surface also generally resembling the configuration illustrated in FIG. 9.

It is believed apparent from the foregoing that it can be observed that the tension and motivation accomplishable by the jet is dependent to a substantial extent on the pressure of the air or other fluid supplied to the jet, the quantity thereof and the like factors. This is illustrated in further detail by reference to the following table:

| Jet air, p.s.i. gage | Exhaust air, c.f.m. | Jet air, c.f.m. | Intake air, c.f.m. | Cu. ft., jet air per hr. | Tension, gram/denier |
|---|---|---|---|---|---|
| 10 | 3.9 | 2.5 | 1.4 | 150 | .02 |
| 20 | 5.8 | 3.8 | 2.0 | 228 | .05 |
| 30 | 6.8 | 5.0 | 1.8 | 300 | .07 |
| 40 | 8.8 | 6.3 | 2.2 | 378 | .07 |
| 50 | 9.8 | 7.3 | 2.5 | 438 | .10 |
| 60 | 10.9 | 8.1 | 2.8 | 486 | .10 |
| 70 | 12.0 | 9.25 | 2.75 | 555 | .10 |

In considering the above table, it will be kept in mind that lower or higher pressures than those illustrated in the table may be used, and the particular pressure used is controlled, to some extent, by the type jet being employed. For example, in employing a jet in accordance with FIG. 2, the use of about 8 lbs. of air consistently produced small loops on normal multifilament cellulose acetate yarn passed therethrough.

Referring to the jets of FIGS. 1, 3 and 6, for example, likewise the use of air pressure of the order of 7 to 9 lbs. produced good uniform loopiness in yarn passing therethrough.

Referring to the jet construction of FIG. 4, for example, pressure of the order of 10 to 12 p.s.i. was satisfactory.

Referring to the jet construction of FIG. 5, pressures between 3 and 15 p.s.i. are utilizable with good results.

As mentioned above, in all of the jets described, it is preferred to equip the orifices where the filamentary material may come in contact with the jet with suitable thread guide members. Thread guide members made of ceramic materials containing titanium oxides, aluminum oxides and silica have been found to be quite satisfactory.

The filamentary material treated in the jets in accordance with the present invention may in most instances be used for any of the purposes with comparable untreated filamentary material heretofore has been used.

The product obtained on spindle 70 from the operation without the yarn passing through the reciprocating guide 66 in FIG. 8 is particularly novel and distinct when made up into fabrics for although the hand is similar to that of staple yarn fabrics, the appearance is very smooth due to the greater denier uniformity inherent in continuous filament yarn. When the reciprocating guide 66 is used the intermittent bulked yarn then produced causes a novel streaked appearance in fabrics due to the increased denier and bulkiness of the looped section as compared to the unbulked sections.

It has also been found that the use of continuously bulked yarn for an insulation wrapper on small electric wires is advantageous because of the superior covering power of bulked yarn.

It is moreover obvious in the removal of waste yarn from godet to feed rolls that the yarn removed by means of the jets herein described is by reason of its bulky separated filament state more readily redissolved and thus improves the recovery of waste yarn and its processing for respinning. Therefore, the exact manner of utilizing the filamentary material produced by the present invention is not a limitation on the present invention.

While in the above description, frequent reference has been made to treating of cellulose acetate yarn, in a similar manner other yarns such as cellulose acetate butyrate, cellulose acetate propionate and the like yarns may be processed in a comparable manner. The denier of the yarn is usually between 150–450. However, heavy denier, say 3000 to 8000 may also be processed. The number of filaments are preferably about 30.

The filamentary material prior to passage around the rolls and through the jet, is preferably suitably lubricated or comparably pretreated so that the mechanical action, changing direction, passing the material in contact with various parts, etc., is facilitated and any breakage is kept to a minimum.

FIGS. 10–16 illustrate another application of the jet devices of the present invention and apparatus for producing yarns other than the intermittent bulked yarn previously described.

Figure 10B:
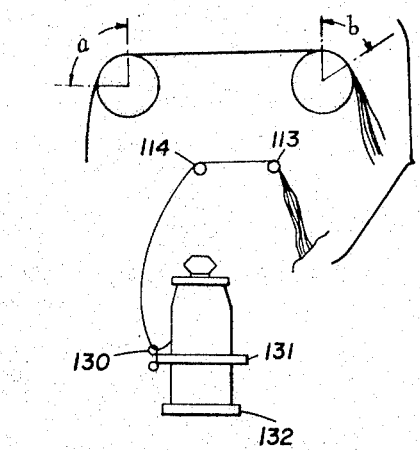
FIG. 10b is a semidiagrammatic side elevation view of alternate yarn windup means of the ring, traveler and bobbin type for producing an interlocked continuous multifilament yarn having a very slight amount of twist in conjunction with the conventional spinning process.
Figure 10:
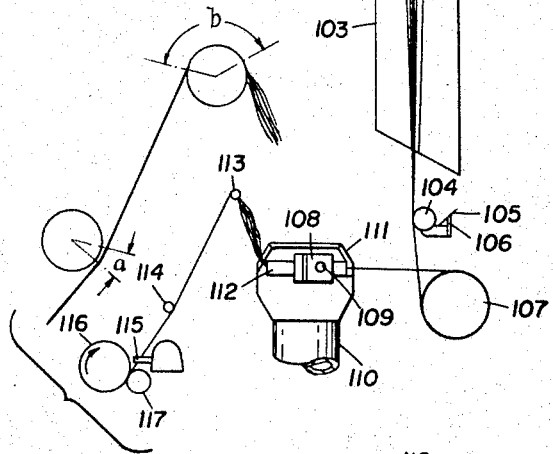
FIG. 10 is a schematic side elevation view partly in section of one form of apparatus for producing an interlocked continuous multifilament yarn in conjunction with a conventional yarn spinning process utilizing a zero twist headless package windup.

Referring to FIGURE 10, a continuous multifilament yarn 101 is extruded from spinnerette 102 into a curing zone or cabinet 103. The yarn may be formed by either melt spinning or solvent spinning processes well known in the art and may be cured in air or other gas or in a liquid coagulating bath also by procedures well known in the art. After curing, the yarn is passed over a liquid applicator such as oil roll 104 which revolves in a yarn finishing agent 105 contained in trough 106. The yarn is drawn from the curing zone 103 and over the application roll 104 by a godet roll 107. The yarn 101 is drawn from the godet roll 107 by the propulsive force of a high velocity air jet 108. This jet, which is of the type discussed earlier, will be described in further detail in connection with FIGURE 11.

The yarn is then directed forward by the air stream and passed over one or more special rod devices or tensioning devices 113 and 114 to a headless parallel package windup represented by a traverse guide 115 and a yarn package 116 rotating against an idler or driving roll 117. Certain enlarged projections have been applied on FIGS. 10 and 10b, perpendicular to and parallel to the parts 113 and 114. As may be noted from these enlarged projections which more clearly show the angle of yarn contact involved it may be observed that in the apparatus of the present invention the yarn contact is less than 180°. That is, the sum of angles $a+b$ does not exceed 180°. These devices will be described in further detail hereinafter. When wound as shown in FIGURE 10, the yarn will have no twist.

Alternately the yarn may be wound as shown in FIGURE 10b by a conventional ring 131 traveler 130 and bobbin 132 apparatus. In this instance the yarn will have a small amount of twist of from 0.05 to 0.5 turn per inch depending on the spinning speed and bobbin speed. Man-made fibers are being spun more and more at very high speeds of 500 to 1500 yarns/minute while bobbin speeds have decreased as package sizes have increased. Therefore, usually not more than 0.3 turn per inch of twist is obtained with a bobbin windup. At this low level of twist, filament separation and high yarn friction may be almost as much of a problem in subsequent processing as they are in zero twist yarn.

Figure 10A:
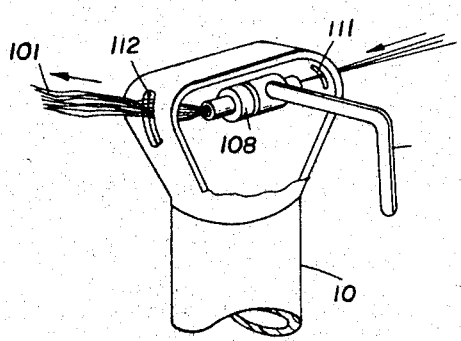
FIG. 10a shows a partial cutaway view of the interlocking apparatus of the present invention by which the need of conventional prior art twist may be eliminated.

Since the action of the very high velocity air tends to blow some of the yarn finishing agent off the yarn, it has been found desirable to enclose the jet 108 in a housing 110 which is connected to an exhaust duct which is maintained under a suction to prevent any oil vapor or fumes from entering the operating area. The housing 110 is slotted at 111 and 112 to allow the yarn to enter and leave the jet 108 as is shown in the partial cutaway view in FIGURE 10a. The housing also contains an opening for the air supply tube 109 to the air jet 108.

Figure 11:
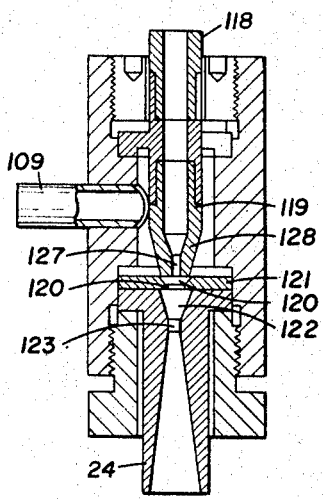
FIG. 11 is a detailed view in section of one form of apparatus for achieving interlocking of the filaments.

The type jet found to be effective in carrying out the process of the invention is shown in FIGURE 11. The jet is substantially the same as fully described in U.S. Patent 2,924,868 for use in entangling, looping or doffing operations or in Caines, Dyer and Pannill U.S. Patents 3,126,-095 and 3,099,594. Those features and modes of operation which differ from the disclosure in my patent will in particular be discussed herein.

In processing the yarn of this invention, it has been found desirable to use a somewhat larger diameter nozzle outlet 127 to facilitate threading of the jet and also to allow some blowback of air counter-current to the yarn entering the jet. It has also been found desirable to adjust the jet so that the amount of air passing between the outer taper of the nozzle tip 128 and the wall of the orifice hole 120 is somewhat greater. This can be done either by increasing the diameter of the orifice hole 120 or by unscrewing the bottom threaded retaining nut to lower the position of the orifice relative to the nozzle tip.

Typical dimensions of a jet used for treating 55 to 300 denier yarn according to this invention were as follows:

|  | 55–150 | 1,500–4,000 |
|---|---|---|
| Diameter of inlet to nozzle (118) | .128″ | .156″ |
| Diameter of outlet of nozzle (127) | .077″ | .156″ |
| Diameter of orifice hole (120) | .092″ | .180″ |
| Included angle of nozzle tip (128) | 60° | 60° |
| Included angle of orifice (120) | 60° | 90° |
| Entrance angle of venturi (122) | 35° | 35° |
| Venturi throat diameter (123) | .100″ | .189″ |
| Venturi throat length (123) | .0625″ | .150″ |
| Venturi exit angle (124) | 10° | 10° |

Proportionately larger dimensions are used when processing yarns of 1500 to 4000 denier and these are also shown.

With this description of the apparatus in mind, attention will now be turned to the factors which affect the processing of the yarn.

As noted in the discussion of FIGS. 1–9, the action of the high velocity air on the yarn passing through it caused appreciable separation and tangling or loopiness in the yarn depending on the tension. When a small amount of tension was maintained in the yarn strand subsequent to its exit from the air jet it was found that the loopiness could be eliminated. In the present embodiment I contemplate the use for parts 113 and 114 of a motorized or powered tension device.

Considering the effect of tension in further detail, the tension in the yarn between the godet roll 107 and the jet 108 preferably is sufficient to prevent the yarn from wrapping the godet roll. The tension between the jet 108 and the guide 113 should be low enough to permit the individual filaments to bloom out and separate as shown in FIGURE 10. This appears to be the most critical zone of tension in the present invention since if the tension here is too high, the filaments will not flare apart and be shuffled in relation to each other to result in the desired degree of filament interlocking or intertwining. Conversely, if the tension is too low, some of the filaments will loop out and give the yarn a damaged, irregular appearance unsuitable for use in a fabric of the type this invention is concerned with.

Figure 16:
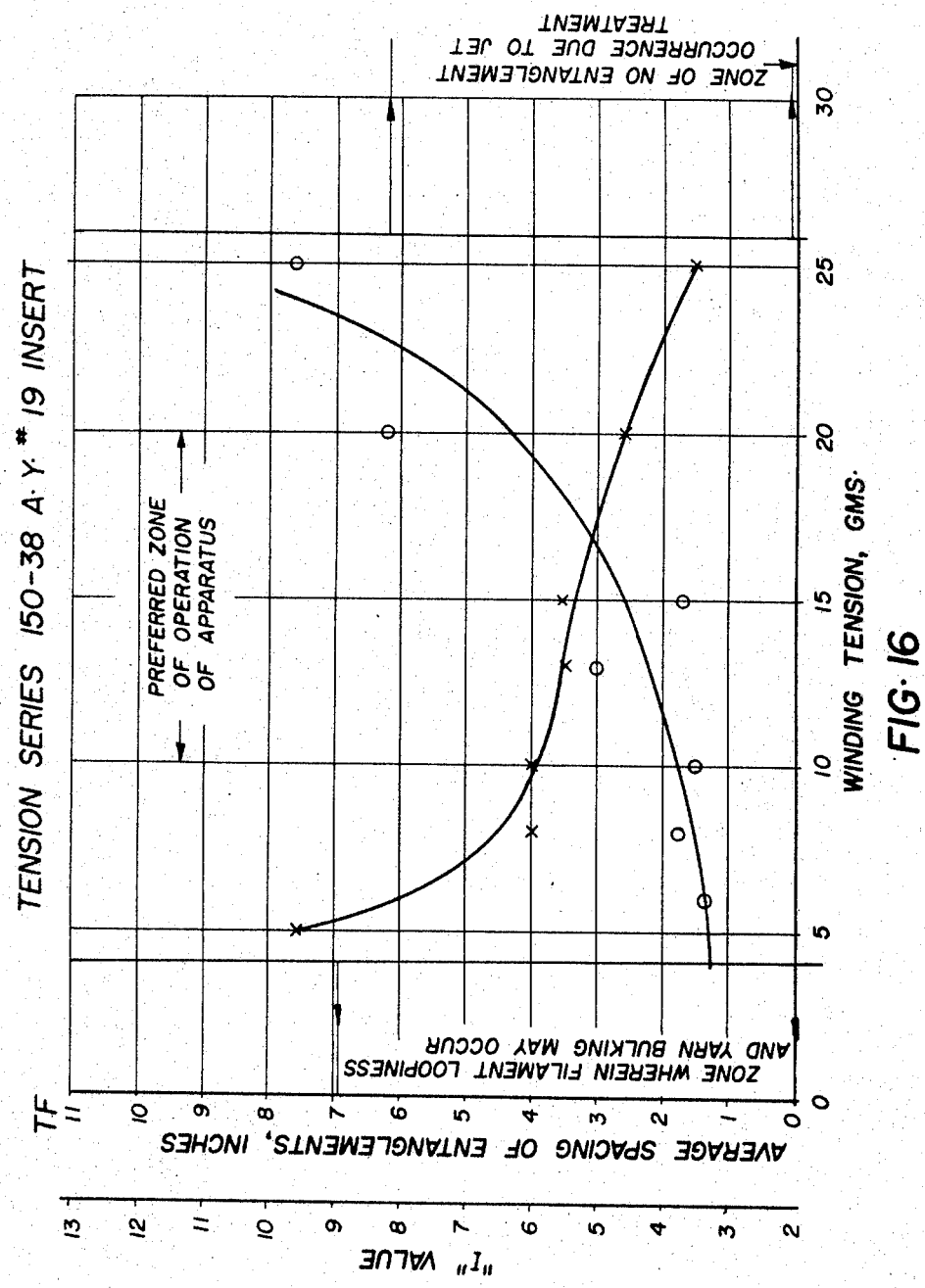
FIG. 16 is a curve showing the interrelated effect of yarn tension and the spacing of the zones of interbraided filaments.

The critical nature of the tension control imparted by the device 113 is graphically shown in FIGURE 16 which is a plot of the average entanglement spacing in inches of a yarn jet treated on the apparatus of this invention versus the winding tension for a 150 denier 38 filament zero twist yarn extruded at 700 meters/minute, processed and wound up as shown in FIGURE 10.

The following table summarizes these results.

Tw. (winding tension)      Average entangled spacing
(grams):
- 0–3 _____ Tendency to make loopy yarn.
- 5 _____ 1.3 inches.
- 8 _____ 1.8 inches.
- 10 _____ 1.5 inches.
- 13 _____ 3.0 inches.
- 15 _____ 1.7 inches.
- 20 _____ 6 inches.
- 25 _____ 7.5 inches.
- 30 or above _____ Little or no occurrence of filament entanglement in zones noted.

The run was repeated using the apparatus of FIGURE 10b and the tension devices 113 and 114. The spindle speed and traveler size were selected so as to produce various levels of yarn tension as measured below guide 114 and the bobbin.

Windup tension range (grams): | Average entanglement spacing
---|---
9–16 | Loopy yarn.
12–24 | Some loops and some entanglement zones of .87 to 4 inches spacings.
18–37 | 5.4 inches (no loops).

The tension between device 114 and the windup should be suitable for the proper formation of a yarn package. As apparent from the drawing, the tensions between the jet 108 and device 113 and between device 114 and the package 116 are interrelated and are controlled by the amount of snubbing around 113 and 114 and the surface finish thereof which in turn partially controls the friction of the yarn on the devices. The type and amount of lubricant on the yarn and amount of yarn delusterant or pigment also affects the friction of the yarn on the tension devices 113 and 114.

It is important that the degree of snubbing on the devices 113 and 114, the frictional properties imparted to the yarn by the application of the lubricant by applicator 104 and the winding tension all be correlated to produce a favorable level of tension in the jet zone 108 to obtain proper filament interbraiding action. For instance, if the oil application at 104 prior to the jet treatment is omitted the yarn will have very high yarn to metal frictional properties and will tend to become highly charged with static electricity.

The tensions in the yarn may be approximated by the following formula:

$$Tw = Tje^{fa}$$

where $Tw$ = winding tension in grams,
$Tj$ = tension between jet 108 and device 113,
$e$ = 2.718 base of natural logarithm,
$f$ = coefficient of friction of yarn on devices 113 and 114,
$a$ = angle of snubbing on devices 113 and 114 expressed in radians.

Assuming a normal acceptable winding tension of 15 grams for a 150 denier cellulose acetate yarn, the following values of the tension in the jet zone ($Tj$) were calculated for 3 values of the coefficient of friction of an unlubricated yarn, 0.8, a lubricated zero twist yarn on metal devices 113 and 114, 0.3, 0.5; and a lubricated zero twist yarn on ceramic devices 113 and 114; and for values of 60 and 180° total snubbing angle, i.e., $\tfrac{1}{3}\pi$ and $\pi$ on devices 113 and 114. These ranges of friction and snubbing represent a range of useful values contemplated by the apparatus of this invention. A fourth value for a snubbing angle of 540° is calculated to indicate the conditions that exist for an apparatus outside the contemplated scope of the apparatus of this invention. The coefficient of friction for a metallic surface should be between 0.4 and 0.6 and between 0.2 and 0.4 for a ceramic surface.

| | $f$ | $a$ | $e^{fa}$ | $Tj$, grams |
|---|---|---|---|---|
| $Tw$, grams: | | | | |
| 15 | 0.8 | $\tfrac{1}{3}\pi$ (60°) | 2.31 | 6.5 |
| 15 | 0.5 | $\tfrac{1}{3}\pi$ (60°) | 1.68 | 8.9 |
| 15 | 0.3 | $\tfrac{1}{3}\pi$ (60°) | 1.36 | 11.0 |
| 15 | 0.8 | $\pi$ (180°) | 12 | 1.2 |
| 15 | 0.5 | $\pi$ (180°) | 4.8 | 3.3 |
| 15 | 0.3 | $\pi$ (180°) | 2.56 | 6.1 |
| 15 | 0.5 | $3\pi$ (540°) | 110 | 0.013 |
| 15 | 0.5 | $\tfrac{2}{3}\pi$ (120°) | 2.85 | 5.3 |

In general the higher the value of $Tj$, the further apart the entanglement spots will be. A useful operating combination has been found to be 15 grams windup tension $Tw$, with a friction value of 0.5 and about 120° of snubbing giving a tension, $Tj$, in the jet zone of about 5.3 grams. This results in an entanglement spacing of about 2 inches with 15 p.s.i. gauge on pressure in the apparatus of FIGURE 10. If the snubbing angle $a$ is excessive as for example 540° in the table, the tension $Tj$ in the jet zone drops nearly to zero, i.e., 0.013 gram, and a bulky crunodal loop type yarn of the type disclosed in U.S. Patent No. 2,852,864 is produced which product is apart from the scope of the invention.

The process may be controlled by adjusting these various factors so that the proper degree of flaring or filament separation is obtained in the yarn between the jet 108 and the tension device 113. While it is not desired to be bound by theory of operation, it is believed that the entanglement or intertwining of the filaments is obtained by separating them and causing them to flare out from each other and then suddenly collapsing them from their flared state by a combination of suddenly separating them from the air stream which tends to shuffle the arrangement of the filaments and passing them over the device 113 which acts to further suddenly force the filaments into an order of arrangement relative to each other which is different from the order in which they entered the jet.

If a zero twist yarn is merely passed over a rod as shown in FIGURE 12, the filaments band out to a side-by-side arrangement as further shown in FIGURE 12a. If, however, they have been exposed to the high velocity air stream of the jet in accordance with the present invention, they take on a partially braided appearance as shown in FIGURE 13 as they pass over a rod in further cross-sectional detail in FIGURE 13a. It has been found that if the air flow in the jet is of a turbulent swirling type, a false twist may be imparted to the yarn and no intertwining of the filaments can take place for they will leave the jet as a compact twisted bundle of filaments. Thus, the air flow in the jet preferably is of a straight line, nonswirling type.

In FIGURE 14 a length of the new interlocked yarn of the present invention is depicted. Spots of entanglement are indicated by the numeral 125, while areas of less or no filament entanglement or intertwining are designated by the numeral 126. In the areas designated as 125 the multifilament yarn has a slightly braided appearance. If a needle is inserted between the filaments in a nonentangled zone at 126 and moved toward an entangled zone 125, it will encounter increasing resistance. At the edge of the zone 125, it will be impossible to move the needle further without breaking some of the filaments in the yarn. The spacing or frequency of the entangled spots can be controlled as will be shown in several examples to follow.

In general, it has been found that entangled spots spaced 2 to 5 inches apart are effective as a substitute for a twist of .5 to 1 turn per inch in a multifilament yarn. The entanglement of the filaments cannot be removed by tensioning the yarn or under conditions of normal textile operations such as winding, beaming, weaving, etc. They can be removed by holding a long length of yarn taut between two clamps and vigorously rubbing the yarn to and fro with a smooth rod. There is no measurable contraction or change in denier of the yarn due to the treatment of the process of this invention. If any change in denier or length does take place, it is less than the inherent yard-to-yard denier variation in a normal yarn and is thus not measurable.

Moreover, except by microscopic or the like examination there is no difference in the appearance of the yarn when compared to a normal low twist yarn having .5 to 1 turn per inch of twist. The yarn of this invention can be used in any application where a normal untreated low twist continuous multifilament yarn is used. When woven in a bridal satin or taffeta fabric, there is no apparent loss in uniformity of lustre or significant change in the level of lustre or change in fabric hand or appearance. When knitted into a tricot lingerie fabric, there are no significant differences in hand or appearance as compared with the conventional zero twist or low twist continuous multifilament yarns commonly used by the industry.

To produce the new yarn of this invention, no differential in speed is required between the delivery or godet roll and the take up package. It is only required that a zone of low tension of say about 0.02 to 0.1 gram/denier in a high velocity nonswirling air stream be established followed by a zone of normal yarn winding tension of about 0.03 to 0.2 gram/denier.

To further define and illustrate the present invention, a number of examples will now be set forth which will disclose certain preferred embodiments.

EXAMPLE I

Two lots, each containing 300 packages of interlocked filament 75 denier 19 filament zero twist bright luster cellulose acetate yarn of the present invention, were extruded from spinnerettes, lubricated with a frictional and static electricity controlling oil finishing agent and processed into a fabric warp and compared with an untreated 75/19/0 twist control yarn fabric. Processing conditions were as follows:

| Type Yarn | Interlocked | Interlocked | Control |
|---|---|---|---|
| Denier | 75 | 75 | 75 |
| Filament count | 19 | 19 | 19 |
| Twist | 0 | 0 | 0 |
| Lubricant | #1 | #2 | #2 |
| Lot No | Q796 | Q797 | Q795 |
| Air jet | (¹) | | None |
| Air pressure, p.s.i.g | 22 | 22 | None |
| Percent oil, percent | 4.4 | 1.9 | 2.7 |
| Yarn speed, m./m | 600 | 600 | 600 |
| Windup type | Zero twist package | | |
| Tension in interlocking zone, gram | 1 | 1 | |
| Windup tension, grams | 9 | 9 | 9 |
| Coefficient of friction on polished steel | .50 | .51 | .60 |
| Coefficient of friction on matte ceramic | .29 | .26 | .29 |
| Coefficient of friction on polished ceramic | .51 | .53 | .67 |
| Yarn width on guide, inch | .0055–.0080 | .0055–.0080 | .0161 |
| Interlock spacing, inches | 2–7 | 2–7 | |
| Beaming tension device | Standard 1 disc 3 post tension | | |
| Beaming tension, grams | 2.5 | 2.5 | ² 6 |
| Beaming speed, y.p.m | 150 | 150 | 150 |
| Quality defects/million end yards | 30 | 52 | 90 |

¹ As described in Fig. 2 for 55–300 denier.
² Due to higher friction of yarn.

The three lots were beamed together as three separate bands of about 266 ends of yarn per band together with four ends of selvage yarn, 75/19/10 turn 2 ply 10 turn on each selvage on 10 beams. Final warp construction was 80 ends of selvage and 7968 ends of test yarn divided between the three experimental lots. The warp was slashed on a rayon type, 7 can, Johnson slasher as follows:

Size formula _____ 27½ lbs. of Stymer S, 2½ lbs. of Lubewax.
Size storage temperature _____ 155° F.
Size box temperature _____ 155° F.
Quetsch roll pressure _____ 1200 lbs.
Percent yarn stretch _____ 12 percent.
Running speed _____ 30 y.p.m.
Can temperatures, 1–7 in order ____ 185, 190, 200, 200, 190, 180, 180° F.

Large numbers of broken filaments occured at the split or bust rod on the Lot Q795 control yarn that had no filament interlocking of the present invention. No difficulty was encountered with either sample of new yarn of the present invention wherein the yarn was extruded, oiled, jet treated under certain tension conditions as referred to above.

After slashing, the warp was drawn in and mounted on a loom. A 100 yard cut of taffeta fabric was woven with 180 warp ends/inch and 60 picks per inch of a standard 150/38/2Z filling yarn. The yarn samples of the present invention gave no trouble in weaving. The control yarn gave trouble due to broken warp ends caused by broken filaments being stripped or skinned back by the drop wires, heddles, and reed.

The fabric was then examined both as woven and after finishing and dyeing. Some broken filaments and warp streaks were noted in all three samples. No differences in hand were noted. The control and the interlocked yarn Lot Q796 with lubricant #1 showed some warp flashes, but the Q797 with lubricant #2 showed no warp flashes in the finished fabrics. It was concluded that the interlocked yarn samples processed much more easily and with higher efficiency than did the control sample while final fabric appearance was essentially the same for both the control and interlocked warp yarns. The control sample processed so poorly in slashing and weaving that it would not be practical to use such a yarn under the typical mill process conditions used in this example.

EXAMPLE II

A sample of 150 denier 38 filament 0 twist yarn in accordance with the present invention was spun (extruded), lubricated, and processed on apparatus similar to that of FIGURE 10 except that the exhaust hood and duct were not used. Yarn speed was 300 meters per minute, air pressure was 22 p.s.i. gauge, windup tension was 12 grams, the filaments were well flared out in the zone between the jet 108 and guide 113 and the yarn was interlocked every 3–6 inches. A control yarn, the same in every respect except that it was not subjected to the process of the present invention, was also made. Both yarns were quilled on a Leesona Unifil loom filling winder at 30 grams tension. Due to its lower friction, the yarn of the present invention required additional weight on the disc tension to achieve 30 grams quilling tension. The yarns were woven in a 180 warp ends/inch by 70 picks/inch 5 harness satin fabric. Less difficulty was encountered with quilling and weaving the interlocked yarn of the present invention as compared to the conventional zero twist yarn. This was due to the lower friction of the new yarn, less tendency to break and strip back filaments, and better withdrawal from the quill in the shuttle as it was woven.

EXAMPLE III

In accordance with this example 1300 packages of 55 denier 13 filament 0 twist yarn were extruded, lubricated and processed in accordance with the present invention on the apparatus of FIGURE 10. Extruding speed was 600 m./m., jet air pressure 20 p.s.i. gauge, windup tension was 7 grams, 3 percent of a 12 percent emulsion of lubricant #2 was applied with 1.65 percent remaining after exposure to the air jet. The jet was operated with a moderate blowback of air through the entrance nozzle. The flaring apart of the filament between the jet 108 and device 113 was good on 9 out of 10 spinning positions with the 10th position judged to be fair. The degree of interlocking ranged from 3–6 inches on the 9 good ends and 6–12 inches on the fair yarn end. The denier before interlocking averaged 55.9 and 55.4 after treatment. The decrease in denier reflects the oil loss noted.

The packages were creeled up on a conventional tricot beamer and four beams of 1175 ends per beam were made. A standard 3 post snubbing tricot tension device was used. The average beaming tension was 5.5 grams/end instead of 7 to 8 grams for prior art yarn. The yarn defects per million end yards of my new yarn were 8.5 which is comparable to conventional tricot yarn which is considered acceptable if it is less than 16 defects per million ends yards.

The beam was then creeled on a 84" tricot knitter and a number of yards of fabric were knit in a 9" quality fabric. One yarn break was encountered in threading up and starting the knitter. Thereafter 800 racks of fabric (200 yards) were knit without a single end break or fabric defect occuring. Conventional 55/13/0 twist prior art yarn if beamed and knit in the same fashion averages (100-150 racks per yarn break or defect). The hand of the fabric was good, and the appearance of the fabric was better than usual with less than the normal amount of streakiness or unevenness occurring. It was concluded that the interlocked yarn of the present invention, due to its lower friction and reduced vulnerability to filament breakage and skinbacks, produced a much better quality fabric with better knitting efficiency than can be obtained with conventional zero twist yarn now used in the trade.

The additional examples which follow will serve to demonstrate various factors which affect the production of an interlocked yarn in the apparatus of the present invention.

EXAMPLE IV

The effect of air pressure on the degree of interlocking achieved in a 55 denier 13 filament zero twist cellulose acetate yarn spun at 600 meters/minute speed on the apparatus of FIGURE 10 is shown in the following table:

| Air pressure, p.s.i. gauge: | Degree of interlocking | Inches space between interlocking, inches |
|---|---|---|
| 0 | None | 41 |
| 10 | Very little | 16 |
| 15 | Fair | 10 |
| 20 | Good | 5 |
| 25 | do | 5 |
| 30 | do | 5 |

Using a needle method for determining the location and spacing of the entangled areas, the inches of yarn length between entangled areas are also shown in the table.

EXAMPLE V

The effect of jet adjustment is shown in the next table. The opening between the nozzle tip and the orifice hole was varied by lowering the orifice plate away from the nozzle tip starting from a closed position where the nozzle tip was in contact with the orifice hole taper.

| | Degree of interlocking | Spacing, inches |
|---|---|---|
| Distance in inches: | | |
| 0.000 | None | |
| 0.093 | Slight | 10-20 |
| 0.109 | Good | 5 |
| 0.125 | do | 3-5 |
| 0.140 | Very high | 1-2 |

In general, extensive work indicates that a higher jet air pressure of say 20 p.s.i. gauge and a less open jet adjustment produces the best interlocking in the jets of the present apparatus. If the jet is opened up too far, the increased air flow tends to break filaments as does too high an air pressure. Low air pressures and small jet openings do not provide enough air velocity and force to properly flare out the filaments of the yarn..

In the case of the .093" spacing the interlocking of the filaments is somewhat intermittent and varies alternately from virtually no intertwining of the filaments in some areas to substantial interlocking of the filaments in other areas.

In the case of the .140" spacing the interlocking of the filaments is substantially continuous along the strand length.

The intermediate spacings result in a degree of interlocking which alternates from slight to great along the yarn strand.

EXAMPLE VI

This example shows the effect of the amount of lubricant applied to the yarn by applicators 104 and 105 of FIGURE 10, on the degree of interlocking.

| | Degree of interlocking | Spacing, inches |
|---|---|---|
| Percent lubricant: | | |
| .84 [1] | Poor | 10-20 |
| 1.08 [1] | Fair | 8-12 |
| 1.17 [1] | do | 8-12 |
| 1.23 | None | |
| 1.90 | Poor | 10-20 |
| 2.49 | Good | 4-6 |
| 3.90 | do | 3-6 |
| 3.46 | do | 3-6 |

[1] The first three levels of lubricant were applied from a 5 percent emulsion of the yarn finishing agent in water. The last 5 samples were prepared using a 15 percent emulsion of lubricant in water.

The lubricant composition applied to the yarn appears to exert an effect on the interlocking process of the present invention. The most highly interlocked yarn may be made by using a straight mineral oil or emulsified mineral oil/water emulsion. Mineral oil imparts a high static frictional property to yarn and thus reduces the tendency of filaments to slide over each other. Mineral oil also has a high electrical resistance and thus promotes the formation of static electrical changes on the yarn filaments. It is believed that either of these characteristics of mineral oil or both cause better flaring of the yarn filaments and more permanent and complex interlocking of the filaments. However, mineral oil is not a good general textile finish because of its scroopy high static friction and poor electrical conductivity properties. Thus, to obtain good processing of a yarn in winding, slashing, weaving, or knitting it is desirable to add waxy or soapy components to reduce the scroop and static friction and other components often of a waxy nature which will reduce or control the generation of static electric charges on the yarn. A typical formulation for a lubricant which imparts good textile processing properties to a yarn would be as follows.

| | Parts by weight |
|---|---|
| Mineral oil | 50-70 |
| An amine soap of oleic acid | 3-10 |
| Oxidized triglyceride oil | 3-10 |
| Amine alkyl sulfate | 5-15 |
| High melting point wax like fatty derivative | 5-15 |

Such an oil designated as #2 was used in Example I in comparison with an emulsified mineral oil designated as lubricant #1. In general, yarn lubricated with #2 oil will interlock less than yarn lubricated with #1 oil when all other conditions are the same. However, I have found that by means of jet adjustments, oil level control, and proper degree of snubbing on the guides 113 and 114, the desired degree of interlocking can be obtained with #2 oil; and the resultant yarn appears to perform better in subsequent textile processing than would a yarn with #1 oil.

While the invention has been described with relation to the preferred form of apparatus shown in FIGURE 10, several apparatus modifications can be made.

For example, FIGURE 15 shows an apparatus arrangement wherein a segment deflector device 140 is placed closely adjacent to the jet exit to increase the abruptness of the separation of the yarn from the air stream. The air is deflected sharply downward as indicated by the arrows while the yarn is removed around the deflector device in an upward direction to the tension 143. The other parts, spinning cabinet 143, godet roll 147, jet 148, tension devices 143, 144, packaging 145, 146 and 147 may be the same as in FIGURE 10. The yarn to be processed as it emerges from the cabinet is shown at 141.

While the invention has been described primarily with zero twist yarn, it is also of value in upgrading low twist yarn so that, for example, a 0.2 turn per inch twisted yarn will perform as efficiently and give as good a quality fabric as say a 1 or 2 turns per inch twisted yarn.

The yarn of the present invention which I term as interlocked yarn and as diagrammatically illustrated in FIGURES 13 and 14 is thought to be a new product. It may be entirely untwisted, or have a small amount of twist but functions as a highly twisted yarn in weaving and the like operations. As indicated above by probing with a pin or the like small pointed instrument the yarn will be found to have small zones of randomly spaced internal entanglement not noticeable on the exterior surface of the yarn except when highly magnified as substantially shown in FIGURE 14. In other words the yarn has the external appearance of regular untwisted yarn but is free of the processing and handling difficulties of such type yarn. The new qualities of my yarn have been demonstrated in the above examples showing the processing of the yarn into fabrics and the like. In some instances it may be desirable to refer to my yarn as an entangled yarn although the entanglement may not be readily discernible by external viewing.

Other applications, variations, and modifications of the process and apparatus as well as variations in the degree of interlocking of the yarn can be made without departing from the spirit of the invention.

Although the invention has been described in detail with reference to preferred embodiments thereof, it will be understood that variations and modifications can be effected within the spirit and scope of the invention as described hereinabove.

I claim:

1. An apparatus for the manufacture of yarn comprising an air jet adapted to receive a yarn bundle comprising continuous filaments and to subject the filaments to air at a pressure up to about 70 p.s.i.g., means for supplying under pressure air to said jet, means for supplying said yarn to the air jet, means for drawing the entire bundle of filaments out of the air jet at essentially the same speed that said yarn bundle is supplied to said jet and such that the bundle of filaments withdrawn from the jet are tensioned by an amount of between .02 and 0.1 gram per yarn denier, the yarn being free of coils, ring-like loops and whorls.

2. An apparatus for the manufacture of intermittently bulked yarn comprising a high speed roll and a low speed roll carried on a common shaft, said high speed roll being of a larger diameter than the diameter of the low speed roll, further rolls operating in contact with the aforementioned rolls, a jet construction adapted to bulk multifilament yarn positioned in close proximity to the aforesaid rolls whereby multifilament yarn may be fed in driving contact with said high speed roll, then conveyed therefrom through said jet and the bulked filaments leaving the jet at an angle in order to make driving contact with said low speed rolls, a yarn take-up mechanism in close association with said low speed rolls whereby the bulk yarn may be formed into a package, and positioned substantially intermediate of said high speed roll and said jet a reciprocating guide whereby the multifilament yarn fed from the high speed roll may be pulled entirely away from its normal path to said jet.

3. An apparatus in accordance with claim 2 where the further rolls are comprised of cork rolls and the yarn take-up mechanism is comprised of a spindle.

4. An apparatus for the manufacture of intermittently bulked yarn comprising a high speed roll and a low speed roll carried on a common shaft, said high speed roll being of a larger diameter than the diameter of the low speed roll, further roll means operating in contact with the aforementioned rolls, means adapted to bulk multifilament yarn positioned in close proximity to the aforesaid rolls, whereby the multifilament yarn may be fed in driving contact with said high speed rolls and then conveyed therefrom through said bulking means, said bulking means being positioned so that the bulked filaments emerge from the means in an angular direction in order to make driving contact with said low speed roll, a means for taking up the bulk yarn in close association with said low speed roll and positioned substantially intermediate of said high speed roll and said bulking means, a motor driven cam mechanism, a thread guide which is attached to the motor driven cam mechanism whereby the multifilament yarn fed from the high speed roll to the bulking means may be pulled entirely away from its normal path.

5. An apparatus including a jet with certain tension means and other means in association with a jet for jet processing a multifilament yarn to provide a finished interlocked yarn which has substantially the same appearance after said jet processing as the yarn fed to said jet processing, the apparatus comprising roll means for feeding a multifilament yarn to said jet, said jet being in series with said roll means and at least one take-up packaging means whereby the yarn may be fed to and through the jet and taken up on the packaging means at approximately the speed of passage to the jet, said apparatus being particularly characterized in that there is a yarn tensioning device in cooperative association with said jet but positioned out of direct line of the path of the multifilament yarn to and from the jet and said tensioning device is further characterized in that it does not apply more than 180° of snubbing to the yarn whereby not less than 0.02 and not more than 0.1 gram per denier tension is applied to the yarn in the jet zone.

6. The apparatus of claim 5 wherein there are two tension devices in association with the jet.

7. The apparatus of claim 5 wherein the jet is covered with an external housing, which housing substantially completely encloses the jet except for an entrance opening in one side of the housing for introducing yarn through the housing into the jet from said roll means and an opening on another side of the housing whereby the jet processed yarn may be withdrawn from the jet through the housing into contact with said tension device.

8. The apparatus of claim 5 wherein the tension device has a curved metallic surface in contact with the yarn which surface is subtended by between 60° to 180° of angle with a coefficient of friction between 0.4 and 0.6 with lubricated polymeric yarn.

9. The apparatus of claim 5 wherein the tension device has a curved ceramic surface in contact with the yarn which surface is subtended by between 60° and 180° of angle with a coefficient of friction between 0.2 and 0.4 with lubricated polymeric yarn.

10. The apparatus of claim 5 wherein the jet includes a housing, a yarn nozzle fitted into the housing to form a gas chamber partially closed at the outer surface of an outlet end of said nozzle by an orifice place, the outlet diameter in said nozzle at its outlet end being between .077 and .156 inch and the orifice plate opening being between .092 and .180 inch, the outlet opening in said partially closed chamber being sufficiently large to pass sufficient gas to cause a blow back of gas through said yarn nozzle outlet opening.

11. Apparatus of claim 5 wherein said means of supplying multifilament yarn includes at least one spinning unit equipped with means for extruding a multifilament yarn from spinnerettes which delivers to said roll means for taking up the formed multifilament yarn from the spinnerette, and means for applying yarn surface finish positioned between said spinning unit and the jet.

(References on following page)

References Cited

UNITED STATES PATENTS

| | | | |
|---|---|---|---|
| 2,189,938 | 2/1940 | Bussiere | 57—38.4 X |
| 2,235,889 | 3/1941 | Keight. | |
| 2,278,888 | 4/1942 | Lewis. | |
| 2,472,283 | 6/1949 | Byers | 19—237 |
| 2,783,609 | 3/1957 | Breen. | |
| 2,807,864 | 10/1957 | Head. | |
| 2,852,906 | 9/1958 | Breen. | |
| 2,884,756 | 5/1959 | Head. | |
| 3,017,737 | 1/1962 | Breen. | |
| 3,103,731 | 9/1963 | Salyer et al. | |

LOUIS K. RIMRODT, *Primary Examiner.*

U.S. Cl. X.R.

57—34